(12) United States Patent
Grojean

(10) Patent No.: US 11,898,596 B2
(45) Date of Patent: Feb. 13, 2024

(54) INSERT INTENDED FOR THE ASSEMBLY OF A FIRST PART AND A SECOND PART BY ELECTRIC RESISTANCE WELDING, AND ASSEMBLY METHOD USING THIS INSERT

(71) Applicant: Maxime Grojean, Commercy (FR)

(72) Inventor: Maxime Grojean, Commercy (FR)

( * ) Notice: Subject to any disclaimer, the term of this patent is extended or adjusted under 35 U.S.C. 154(b) by 515 days.

(21) Appl. No.: 16/610,393

(22) PCT Filed: May 2, 2018

(86) PCT No.: PCT/FR2018/051094
§ 371 (c)(1),
(2) Date: Nov. 1, 2019

(87) PCT Pub. No.: WO2018/202999
PCT Pub. Date: Nov. 8, 2018

(65) Prior Publication Data
US 2021/0088062 A1    Mar. 25, 2021

(30) Foreign Application Priority Data

May 4, 2017    (FR) .................................. 17/53944

(51) Int. Cl.
*F16B 5/08* (2006.01)
*B23K 11/11* (2006.01)

(52) U.S. Cl.
CPC ............... *F16B 5/08* (2013.01); *B23K 11/11* (2013.01)

(58) Field of Classification Search
CPC ..... B23K 11/14; B23K 11/11; B23K 35/0288; B23K 11/115; B23K 11/20; B23K 11/3018; B23K 11/0066; F16B 37/061; F16B 5/08

(Continued)

(56) References Cited

U.S. PATENT DOCUMENTS 4,119,827 A    10/1978  Lenox
7,722,303 B2   5/2010   Williams
(Continued)

FOREIGN PATENT DOCUMENTS

CN    101590598 A    12/2009
CN    105190059 A    12/2015
(Continued)

OTHER PUBLICATIONS

International Search Report for Application No. PCT/FR2018/051094.
(Continued)

*Primary Examiner* — Sarang Afzali
*Assistant Examiner* — Darrell C Ford
(74) *Attorney, Agent, or Firm* — CANTOR COLBURN LLP

(57) ABSTRACT

An insert including: a head portion including a docking face configured to receive a welding electrode and a bearing surface configured to come to bear on the first part in order to keep the first part assembled to the second part, a body portion intended to be inserted into the first part, including a welding surface configured to be welded to the second part, the body portion having a cross section smaller than that of the head portion, and thermal decoupling means extending around the body portion to prevent heat released by the body portion from being transmitted to the first part during the welding operation.

15 Claims, 10 Drawing Sheets

(58) Field of Classification Search
USPC .......................................................... 411/171
See application file for complete search history.

(56) References Cited

U.S. PATENT DOCUMENTS

| | | | | |
|---|---|---|---|---|
| 8,434,962 | B2* | 5/2013 | Christ | B23K 20/129 |
| | | | | 228/112.1 |
| 8,486,508 | B2 | 7/2013 | Christ et al. | |
| 9,643,356 | B2* | 5/2017 | Matsuo | F16B 19/06 |
| 10,064,245 | B2 | 8/2018 | Kondo et al. | |
| 10,549,377 | B2 | 2/2020 | Inami et al. | |
| 2006/0213954 | A1* | 9/2006 | Ruther | B21J 15/027 |
| | | | | 228/114.5 |
| 2007/0092354 | A1* | 4/2007 | Nilsen | F16B 37/061 |
| | | | | 411/171 |
| 2007/0295698 | A1* | 12/2007 | Hengel | B23K 11/14 |
| | | | | 219/93 |
| 2009/0042049 | A1* | 2/2009 | Sandoz | F16B 37/14 |
| | | | | 219/61 |
| 2009/0294410 | A1 | 12/2009 | Iwase et al. | |
| 2011/0097142 | A1 | 4/2011 | Bassler et al. | |
| 2014/0356101 | A1 | 12/2014 | Bassler et al. | |
| 2015/0063944 | A1* | 3/2015 | Maloney | F16B 19/06 |
| | | | | 411/500 |
| 2015/0217395 | A1* | 8/2015 | Spinella | F16B 37/061 |
| | | | | 403/267 |
| 2015/0239061 | A1* | 8/2015 | Hamlock | B23K 11/004 |
| | | | | 219/93 |
| 2015/0258624 | A1* | 9/2015 | Draht | B21J 15/08 |
| | | | | 228/139 |
| 2016/0084288 | A1* | 3/2016 | Chung | F16B 19/086 |
| | | | | 411/82 |
| 2016/0123362 | A1* | 5/2016 | Iwase | F16B 19/06 |
| | | | | 411/82 |
| 2016/0136880 | A1* | 5/2016 | Matsuo | B29C 65/562 |
| | | | | 411/502 |
| 2016/0167158 | A1* | 6/2016 | Spinella | B23K 11/3009 |
| | | | | 403/270 |
| 2020/0156176 | A1* | 5/2020 | Draht | B23K 11/185 |
| 2020/0361022 | A1* | 11/2020 | Matsunaga | B23K 11/0066 |

FOREIGN PATENT DOCUMENTS

| | | | |
|---|---|---|---|
| DE | 4237361 | A1 | 5/1994 |
| DE | 102007021891 | A1 | 11/2008 |
| DE | 102010026040 | A1 | 1/2012 |
| DE | 102014201871 | A1 | 8/2015 |
| DE | 102015207517 | A1 | 11/2016 |
| EP | 1691087 | A2 | 8/2006 |
| EP | 3026273 | A1 | 6/2016 |
| EP | 0967044 | A2 | 12/2022 |
| FR | 1101391 | A | 10/1955 |
| JP | H07214338 | A | 8/1995 |
| JP | 2006220300 | A | 8/2006 |
| JP | 2013026622 | A | 2/2013 |
| JP | 2014000580 | A | 1/2014 |
| JP | 2015024436 | A | 2/2015 |
| JP | 2015062911 | A | 4/2015 |
| JP | 2016155154 | A | 9/2016 |
| JP | 2016161078 | A | 9/2016 |
| JP | 2016186344 | A | 10/2016 |
| KR | 1020140018641 | A | 2/2014 |
| WO | 2009135553 | A1 | 11/2009 |
| WO | 2015075964 | A1 | 5/2015 |
| WO | 2017165814 | A2 | 9/2017 |

OTHER PUBLICATIONS

Written Opinion for Application No. PCT/FR2018/051094.
English Machine Translation of FR1101391.
JP Office Action for Japanese Application No. 2020-512093 dated Apr. 18, 2022, 8 pages.
Machine Translation of JP Office Action for Japanese Application No. 2020-512093 dated Apr. 18, 2022, 10 pages.
Brazil Search Report for Application No. BR112019023044-0; Date of Search Jul. 5, 2022, 4 pages.
European Search Report for European Application No. 21200785.0; Date of Sear Jan. 25, 2022; dated Sep. 26, 2022, 5 pages.
Chinese Search Report dated Feb. 22, 2021; CN Application No. 201880411113; 2 pages.
Decision to Grant dated Jan. 10, 2023; JP Application No. 2020-512093; 2 pages (English).
Decision to Grant dated Jan. 10, 2023; JP Application No. 2020-512093; 3 pages (non-English).
Extended European Search Report dated Feb. 2, 2022; EP Application No. 21200785.0; 8 pages; Non-English.
Search; FR Application No. 1753944; 2 pages; Non-English.
First Chinese Office Action dated Mar. 3, 2021; CN Application No. 201880411113; 14 pages; English translation Included.
Notice of Reasons for Refusal dated Oct. 18, 2022; JP Application No. 2020-512093; 2 pages (English translation).
Notice of Reasons for Refusal dated Oct. 18, 2022; JP Application No. 2020-512093; 2 pages (non-English).
Opinion; FR Application No. 1753944; 1 page; Non-English.
Search Report dated Apr. 1, 2022; JP Application No. 2020-512093; 23 pages; English Translation included.
Machine Translation of DE 102010026040.
Machine Translation of DE 102015207517.

* cited by examiner

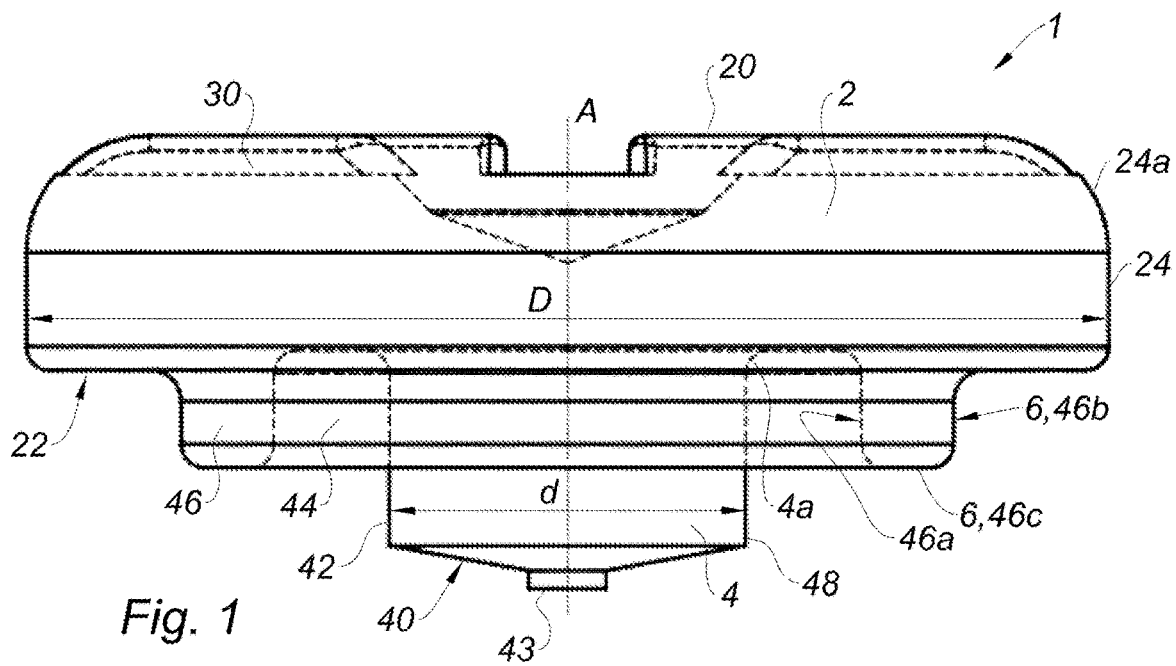
Fig. 1
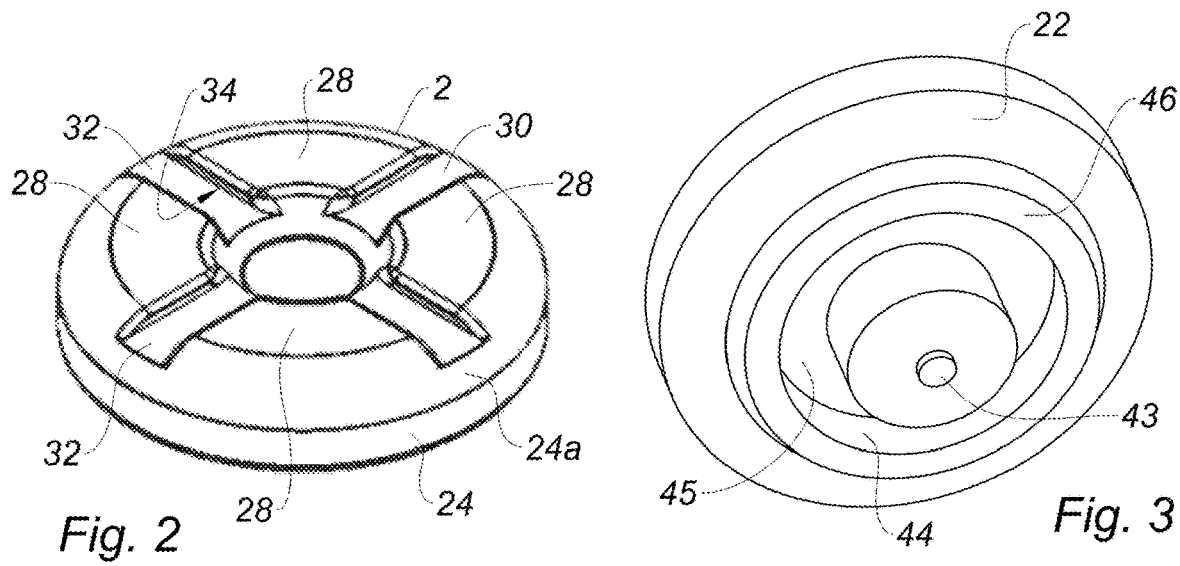
Fig. 2
Fig. 3
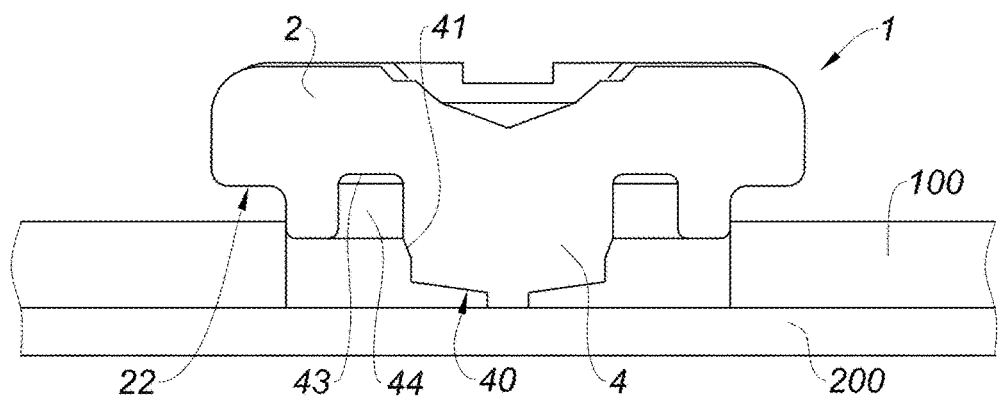
Fig. 4A

INSERT INTENDED FOR THE ASSEMBLY OF A FIRST PART AND A SECOND PART BY ELECTRIC RESISTANCE WELDING, AND ASSEMBLY METHOD USING THIS INSERT

CROSS REFERENCE TO RELATED APPLICATIONS

This application is a National Stage of PCT Application No. PCT/FR2018/051094 filed on May 2, 2018, which claims priority to French Patent Application No. 17/53944 filed on May 4, 2017, the contents each of which are incorporated herein by reference thereto.

TECHNICAL FIELD

The present invention concerns an insert intended for the assembly of two parts or more by electric resistance welding, as well as a method for assembling these two parts by means of this insert.

BACKGROUND

It is known, in particular in the field of land or air transportation, to make multi-material assemblies integrating both components such as steel, aluminum, magnesium, as well as components made of a composite material, of the type with a matrix and a reinforcement, or plastic. These multi-material assemblies address the problems of lightening the vehicles in order to reduce the energy consumption or to improve the dynamic behavior of the vehicle, structural reinforcement in order to meet the requirements in terms of safety, or else reduction of the number of components in the vehicles.

However, multi-material assemblies are relatively difficult to implement considering the very nature of these assemblies, requiring fastening parts made of materials with different properties in an easy, economical, durable and robust manner.

It is known to make multi-material assemblies for example by gluing. However, this solution generally implies a relatively considerable cross-linking or drying time and may also have the drawback of an alteration of the performances of the assembly under the effect of ageing, such that its application remains restricted to well determined cases.

It is also known to make multi-material assemblies by means of flowdrill screws and nails. However, this solution does not enable the making of an assembly including in particular high-performance steel sheet metals. Another drawback is the existence of a residual projecting protrusion after assembly.

Finally, it is known to make assemblies via a spot welding technique, in particular during a body-in-white assembly operation. Spot welding or electric resistance welding is an assembly solution which has the advantage of being both economical and performant on the mechanical level. Nonetheless, this technique is restricted to the assembly of two elements made of materials of the same nature, such as typically two steel sheet metals. This technique turns out to be complex to implement when the assembly to be made comprises elements with materials of different natures, such as for example an aluminum-steel, steel-composite, aluminum-plastic assembly, etc. In order to overcome that, it is known to use inserts, also called welding patches, which are positioned in one of the elements to be assembled and on which the welding electrode is applied to carry out the assembly. Hence, these welding patches allow making multi-material assemblies.

However, the welding patches have several drawbacks. The dimensions, in particular the diameter, of the welding patches are generally considerable. Indeed, this allows ensuring the docking of the electrodes of a welding clamp on the patches rather than on the part into which the patch is inserted, without having to adjoin a vision positioning system on the robotized welding arms. In addition, this allows dissipating the heat generated during the welding before that heat reaching and melting or altering the material of the part into which the welding patch is inserted. This relatively considerable dimensioning implies a high material cost, as well as an increased mass, going against the current problem of lightening the vehicles. Besides, the fitting of the welding patches into the part to be assembled requires the arrangement of holes with a diameter adapted to these welding patches, and therefore also a relatively considerable diameter, which tends to weaken the part receiving the welding patches. Also, it is still complex to effectively fit welding patches into parts for example made of a plastic or composite material.

BRIEF SUMMARY

Also, the invention aims at overcoming all or part of these drawbacks by proposing an insert, intended for the assembly of two parts by electric resistance welding, limiting the weakening of the assembly, offering a reduced cost, and which can be used without requiring considerable equipment investments.

To this end, an object of the present invention is an insert intended for the assembly of a first part and a second part by electric resistance welding of the insert and of the second part, characterized in that the insert comprises:

a head portion, the head portion comprising a docking face configured to receive a welding electrode and a bearing surface configured to bear on the first part in order to hold the first part assembled to the second part, a body portion intended to be inserted into the first part, the body portion comprising a welding surface configured to be welded to the second part, the body portion having a section smaller than that of the head portion, and a thermal decoupling element extending around the body portion to prevent a transmission of the heat released by the body portion to the first part during the welding operation.

Thus, the insert according to the invention allows making a multi-material assembly by electric resistance welding, this assembly being robust, with limited material costs, and can be carried out with existing resistance welding equipment, which also allows reducing the costs.

Indeed, the thermal decoupling element limits the transmission of heat to the first part in which the insert is positioned, which avoids the risk of altering, under the effect of the temperature rise, a material of the first part. This is particularly advantageous when the first part comprises a plastic material, such as for example the matrix of a composite.

Besides, the section difference between the head portion receiving the welding electrode and the body portion at the end of which the welding point is performed allows for a concentration of the welding energy and of the heat-up at the level of the body portion, in particular at its send, and a lesser heat-up of the head portion, and therefore a more rapid dissipation of heat at the level of the head portion. This also limits the transmission of heat from the head portion to the first part during the welding operation. The section difference also allows providing a relatively considerable docking face, which offers a tolerance with regards to the accuracy of the location of the robot conveying the welding electrode on the insert. In other words, it is not necessary to invest and adjoin to the robot an additional and costly vision positioning system.

Also, the body portion is intended to be inserted through the first part, in particular through a hole made through the first part. Since this body portion has a reduced section, the hole has a reduced dimension, which limits the structural weakening of the first part.

According to one embodiment, the insert comprises a holding element configured to hold the insert in position through the first part.

This allows keeping the body portion, that one which heats up the most during the welding, at a distance from the first part in order to limit any risk of degradation of the first part.

According to one embodiment, the thermal decoupling element comprises a peripheral area or housing intended to contain a heat-insulating material.

This solution allows effectively isolating the body portion from the first part at lower costs.

According to one embodiment, the peripheral area or housing is delimited by one or several element(s) projecting from an underside of the head portion.

According to one embodiment, a tip of the projecting element(s) forms a cutting edge intended to cut the first part.

According to one embodiment, the welding surface is configured to bear against the first part before the cutting edge formed by the tip. Thus, the welding surface may project from a plane tangent to this tip.

According to one embodiment, the projecting element(s) extends at least up to the mid-height of the body portion.

According to one embodiment, the thermal decoupling element comprises a part made of a heat-insulating material.

According to one embodiment, the thermal decoupling element comprises a heat-insulating material coating.

This solution offers an improved compactness, limiting the dimensions of the hole made in the first part, and consequently the mechanical weakening of this first part.

According to one embodiment, the head portion comprises at least one venting conduit.

This allows dissipating more rapidly the heat released at the level of the head portion during the welding, and therefore limiting the risk of melting the portion of the first part in contact with the head portion.

According to one embodiment, the head portion comprises an engagement surface configured to receive a tool in order to apply to the head portion a force intended to break the weld or the insert.

This feature allows easily breaking the insert, and therefore facilitating a maintenance or replacement operation requiring the disassembly of the first part and the second part.

According to one embodiment, the body portion comprises a portion with a reduced section in the direction of the welding surface.

This section constriction allows focusing the heat at the end of the body portion during the welding, in order to limit the diffusion of heat in the other portions of the insert and in the thermal decoupling area, in particular towards the first part.

According to one embodiment, the insert comprises a fastening element configured to allow fastening on the insert a component intended to cooperate with said fastening element.

This allows attaching other parts on the assembly of the first and second parts achieved beforehand by means of the insert.

According to one embodiment, the head portion comprises a first material and the body portion comprises a second material distinct from the first material.

This feature allows creating an electric resistivity difference along the insert, complementary with that materialized by the section difference between the head portion and the body portion, in order to concentrate the electric current lines towards a central portion of the head portion and consequently limit the risk of transmission of heat to the first part via the head portion. Thus, the different portions of the insert may comprise distinct materials. For example, the head portion is made of aluminum, the body portion of steel, which is more resistive, and the thermal decoupling element of ceramic.

According to one embodiment, the bearing surface has a peripheral flange intended to bear against the first part.

According to another embodiment, another object of the invention is a method for assembling a first part and a second part, the assembly method comprising the steps of: fitting an insert having the aforementioned features into the first part, welding the insert on the second part.

According to one embodiment, the step of fitting the insert into the first part is performed during the manufacture of the first part.

This offers time saving, and therefore limits the cost of the method.

According to one embodiment, the step of fitting the insert into the first part comprises a step of cutting the first part by the insert.

According to one embodiment, the welding step is an electric resistance welding step. The method may comprise a step of applying a welding electrode on the insert. This welding electrode advantageously has a section larger than or equal to the section of the head portion of the insert.

This enables the docking of the welding electrode by compensating for position inaccuracies (the insert with respect to the first part, the first part with respect to the second part, the robot arm with respect to the set formed by the first part and the insert, etc.).

The relatively considerable dimension of the welding electrode also allows distributing the welding energy over a larger surface. The larger the contact surface between the head portion of the insert and the electrode, the lesser energy is transmitted per unit of surface, which limits the temperature rise at the level of the head portion and therefore contributes to protecting the first part.

Also, the limitation of the temperature rise between the electrode and the insert promotes the repeatability and the constancy of the welding. The electrode is less degraded and needs to be replaced less often.

According to one embodiment, the method comprises a step of cooling the insert.

This allows limiting the heat transmitted to the first part during the welding operation. This also allows limiting the temperate rise between the electrode and the insert, and therefore also limiting the deterioration of the electrode.

According to one embodiment, the method comprises the use of one single electrode applied on the insert, in particular on the head portion of the insert.

This allows for a single-access welding, that is to say possible by docking an electrode on only one side. In other words, it is no longer necessary to pinch the assembly between two electrodes, but simply setting the second part at the polarity opposite to that of the welding electrode applied on the insert, the insert being in contact with the second part. This allows working with parts where access to the welding area is difficult.

According to one embodiment, the assembly method comprises a step of gluing the first part and the second part.

This combination of the insert according to the invention with a gluing allows improving the effectiveness of the gluing and, consequently, the use of less expensive glues, because they are less complex.

According to one embodiment, the method comprises the formation of a boss in the second part.

BRIEF DESCRIPTION OF THE DRAWINGS

Other features and advantages of the present invention will come out clearly from the detailed description hereinafter of an embodiment, provided as a non-limiting example, with reference to the appended drawings in which:

FIG. 1 is a side and semi-transparent view of an insert according to an embodiment of the invention, FIGS. 2 and 3 are respectively top and bottom perspective views of an insert according to an embodiment of the invention, FIGS. 4A and 4B are sectional views of an insert according to an embodiment of the invention, respectively before and after assembly of a first part and a second part by means of this insert.

DETAILED DESCRIPTION

Figure 4B:
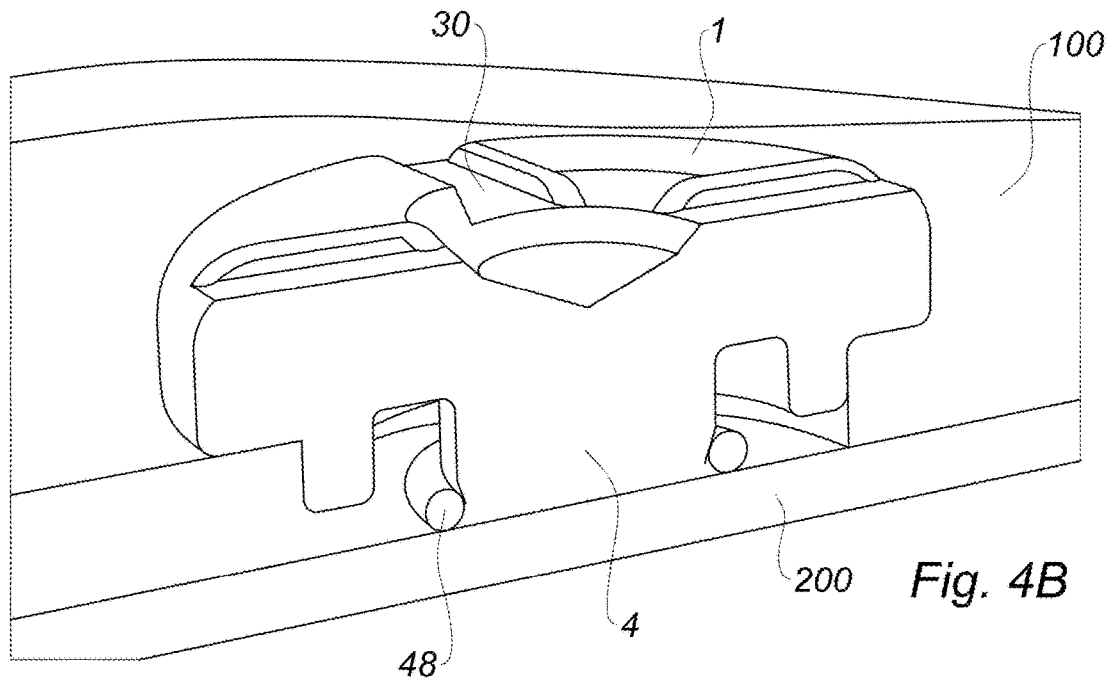
Figure 5A:
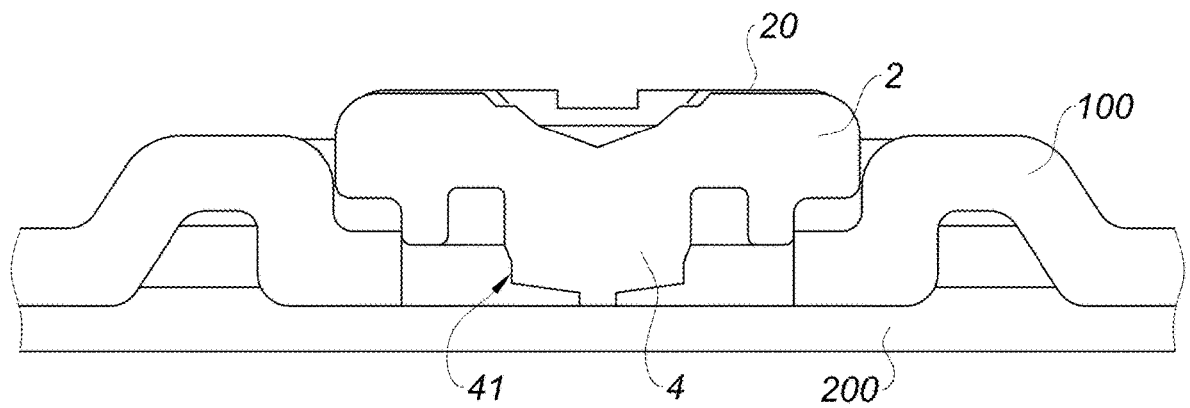
FIGS. 5A and 5B are sectional views of an insert according to an embodiment of the invention, respectively before and after assembly of a first part and a second part by means of this insert.
Figure 5B:
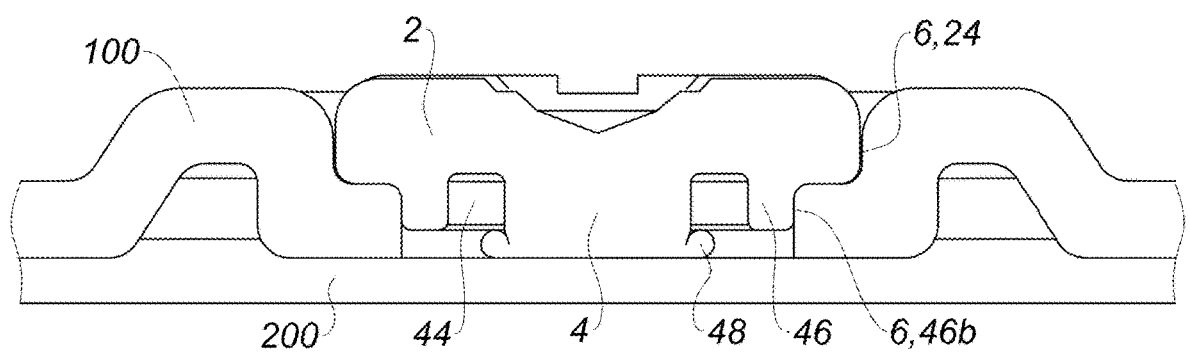
Figure 20A:
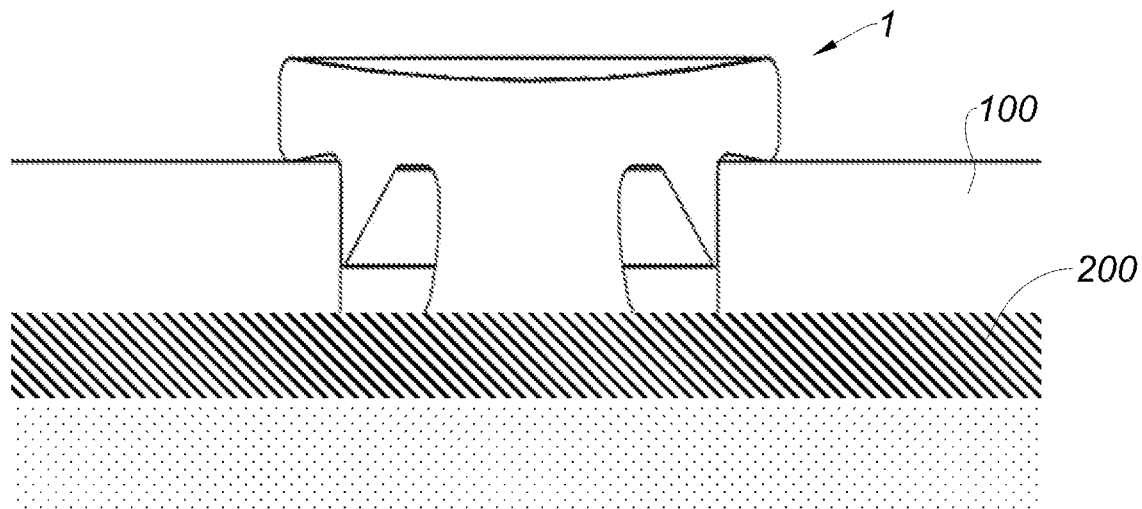
FIGS. 20A and 20B are sectional views of an insert according to an embodiment of the invention.
Figure 20B:
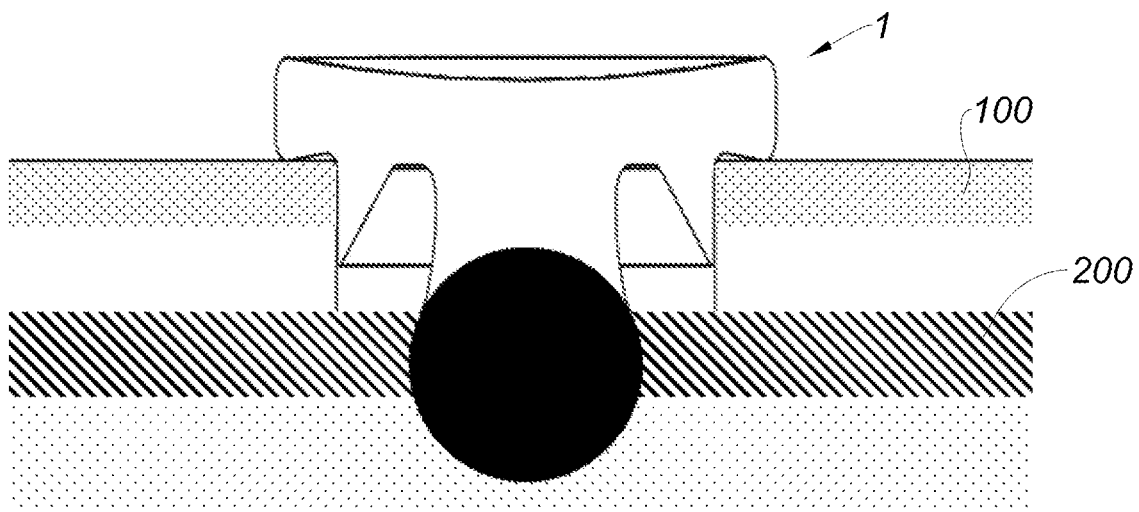

FIG. 1 shows an insert 1 according to an embodiment of the invention. The insert 1 is intended for the assembly of a first part 100 and a second part 200, shown for example in FIGS. 4A and 4B, via an electric resistance welding operation, also called resistance spot welding (RSW). The insert 1 could also enable the assembly of more than two parts or stacked sheet metals, by electric resistance welding, as shown in FIGS. 20A and 20B.

The insert 1 is intended to be inserted through a hole formed in the first part 100, to be set in contact with the second part 200, herein positioned under the first part 100, and crossed by an electric current in order to cause a temperature rise and consequently a welding of the insert 1 and the second part 200, the first part 100 remaining held assembled to the second part 200 by the insert 1.

The first part 100 and the second part 200 may comprise different materials. As example, the first part 100 may be made of a plastic or composite material, for example with a thermoplastic or thermosetting matrix and with short or long fibers type reinforcements, whereas the second part 200 may be made of metal, for example of steel. When the first part 100 is made of an electrically-conductive material, for example metallic, the insert 1 may be partially or completely covered with an electrically-insulating coating in order to avoid a short-circuit.

The insert 1 comprises a head portion 2 and a body portion 4.

Figure 12A:
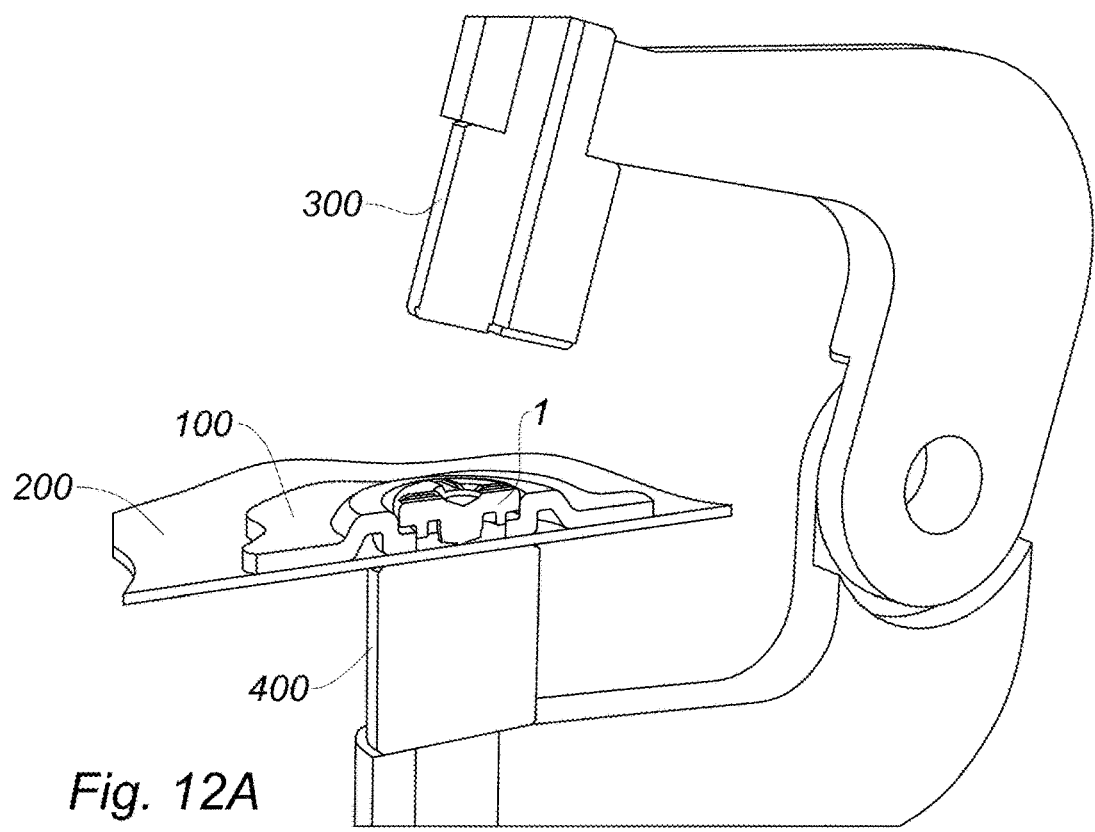
FIGS. 12A and 12B are perspective and sectional views illustrating steps of a method for assembly by means of an insert according to an embodiment of the invention.

The head portion 2 may have a disk shape. The head portion 2 comprises a docking face 20 intended to receive the welding electrode 300, shown in FIGS. 12A and 12B, and, underneath, opposite to the docking face 20, a bearing surface 22 intended to bear against the first part 100 in order to prevent a disassembly of the first and second parts 100, 200. Preferably, the bearing surface 22 corresponds to a peripheral surface of the underside of the head portion 2. The bearing surface 22 may have an annular shape. The docking face 20 and/or the bearing surface 22 may be orthogonal to a longitudinal axis A of the insert 1, or parallel to each other.

The head portion 2 may comprise a lateral wall 24, for example cylindrical, connecting the docking face 20 and the underside of the head portion 2. The lateral wall 24 may be intended to bear against the first part 100, in order to contribute to holding the first part 100 and the insert 1, as illustrated in FIGS. 5A, 5B, 6A and 6B. According to the example of FIGS. 5A and 5B, the resistance to shear of the set formed by the insert 1 and the first and second parts 100, 200 is enhanced by distributing the shear stress over the largest possible surface of the insert 1. The body portion 4 is intended to be inserted into the first part 100. The body portion 4 may have a cylindrical shape.

Figure 6A:
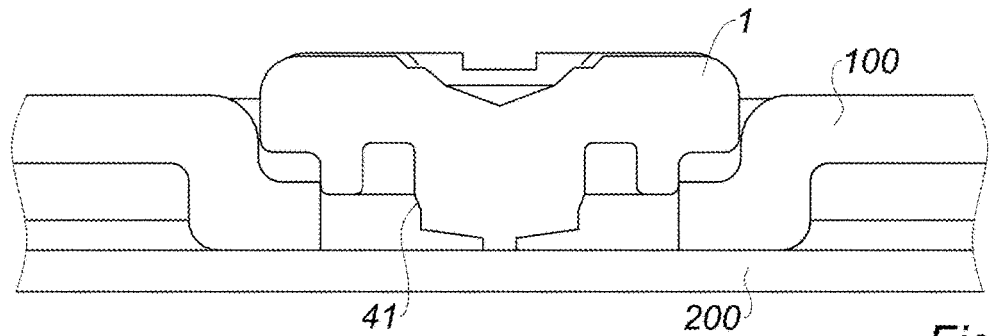
FIGS. 6A and 6B are sectional views of an insert according to an embodiment of the invention, respectively before and after assembly of a first part and a second part by means of this insert, where a functional clearance is provided between the first and second parts to enable in particular the application of a surface protection on the opposing faces of the first and second parts, the functional clearance forming a passage for the circulation of a fluid.
Figure 6B:
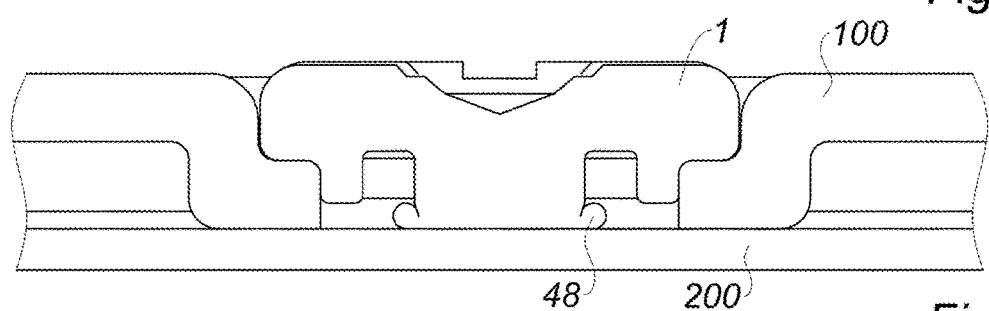
Figure 7:
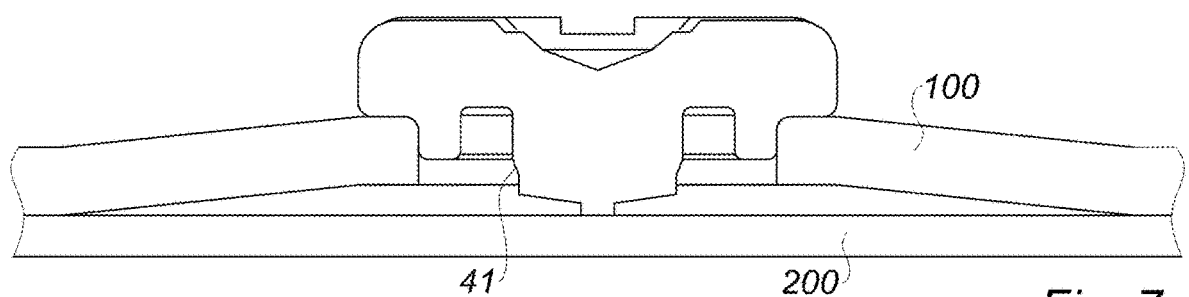
FIG. 7 is a sectional view of an insert according to an embodiment of the invention before assembly of a first part and a second part by means of this insert, allowing generating an assembly mechanical tension between the first and second parts after carrying out the operation of welding the insert.

The body portion 4 may extend longitudinally along the axis A. The body portion 4 extends from the underside of the head portion 2. The body portion 4 comprises a first end 4a connected to the head portion 2, at the level of its underside, and an opposite second end 4b. The body portion 4 may advantageously has a section difference towards its second end 4b, in particular a portion 41 with a smaller section compared to a portion of the body portion 4 connected to the head portion 2, as shown in FIG. 4A, 6A, or 7. The portion 41 with a smaller or decreasing section preferably extends at the level of the second end 4b of the body portion 4, this portion 41 with a decreasing section may be adjacent to the welding surface 40. For example, the portion 41 with a decreasing section may have a cylindrical and/or trunconical shape. This section constriction allows concentrating in a quite localized manner the heat after the welding process has been initiated in particular by the primer 43. This allows making an accurate and constant melting point. This also allows having a matter reserve to compensate for the variation of thicknesses of the first part 100 and thus self-adjust to the welding the actual length of the body portion 4 adapted to a quality docking and therefore joined between the first and second parts 100, 200. The portion 41 with a smaller or decreasing section, where appropriate the primer 43, is configured so that this excess material remains at a distance from the first part 100 and contained within the limits of the thermal decoupling area. Thus, the insert 1 has a wider use range in terms of variation of thickness of the first part 100.

The second end 4b comprises a welding surface 40 intended to be welded to the second part 200. The body portion 4 has a lateral wall 42. The welding surface 40 may have a section decreasing in a direction opposite to the head portion 2. For example, the welding surface 40 may have a conical or trunconical shape. Moreover, the welding surface 40 may comprise a welding primer 43 extending in projection from the welding surface 40.

The head portion 2 and the body portion 4 are configured to enable the circulation of an electric current from the docking face 20 up to the welding surface 40. In particular, the head portion 2 and the body portion 4 comprise an electrically-conductive material, for example material. The insert 1, in particular the head portion 2 and/or the body portion 4, may comprise steel, aluminum, titanium or copper.

The head portion 2 and the body portion 4 may be integral, or else be fastened to each other to form the insert 1. The head portion 2 may comprise a first material and the body portion 4 may comprise a second material distinct from the first material, in particular with an electric resistivity higher than that of the first material. This allows reinforcing an electric resistivity difference between the head portion 2 and the body portion 4, in order to preferably localize the electric power, and therefore the generated heat, at the center of the insert 1. For example, the head portion 2 comprises aluminum, the body portion 4 comprises steel. According to one possibility, the body portion 4 comprises several materials having different electric resistivities. More particularly, the second end 4b of the body portion may comprise a material with an electric resistivity higher than the rest of the body portion 4 or a material more suitable for the formation of a quality weld with the second part 200.

It should be noted that the body portion 4 has a section smaller than that of the portion of the head portion 2. In particular, the body portion 4 has dimensions (others than its height along the axis A) smaller than that of the head portion 2. As illustrated in FIG. 1, the body portion 4 may have a diameter d smaller than the diameter D of the head portion. Preferably, the section or diameter ratio between the body portion 4 and the head portion 2 is in the range of at least 15%.

Preferably, the body portion 4 extends centrally from the head portion 2 so that the electric current lines crossing the insert 1 during the electric resistance welding operation, are concentrated at the center of the insert 1.

The insert 1 comprises a thermal decoupling element intended to prevent a transmission of heat from the body portion 4 up to the first part 100 during the welding operation. The thermal decoupling element is intended to be interposed between the body portion 4 and the first part 100 during the welding operation, more specifically between the body portion 4 and the bearing surface 22. The thermal decoupling element extends all around the body portion 4, in particular all around the first end 4a of the body portion 4, between the latter and the bearing surface 22.

It is possible to provide for a thermal decoupling element further extending between the head portion 2 and the first part 100, that is to say around the head portion 2 and in particular around the lateral wall 24 of the head portion 2, in particular if the thermal decoupling element comprises a material compliant with pullout bias. Moreover, the thermal decoupling element may comprise a material also adapted to withstand the shear stresses and thus contribute to holding the first part 100, in particular when the thermal decoupling element is intended to be in contact with the first part 100.

As illustrated in FIG. 3, the thermal decoupling element advantageously comprises a peripheral area or housing 44, for example annular shaped, extending around the lateral wall 42 of the body portion 4, and intended to contain a heat-insulating material, such as air.

The thermal bridge breaking area or housing 44 may be delimited by one or several element(s) 46 projecting from the underside of the head portion 2, such as a rib, for example annular. The projecting element(s) 46 is arranged at a distance of the body portion 4, in particular all around the latter. The projecting element(s) 46 may have an internal lateral face 46a and an external lateral face 46b. The thermal bridge breaking area or volume 44 is herein partially delimited by the lateral wall 42 of the body portion 4, the face 46b of the projecting element 46, and a bottom wall 45. The thermal decoupling element may include the projecting element 46, which may be made of a heat-insulating material, for example of ceramic.

Figure 14:
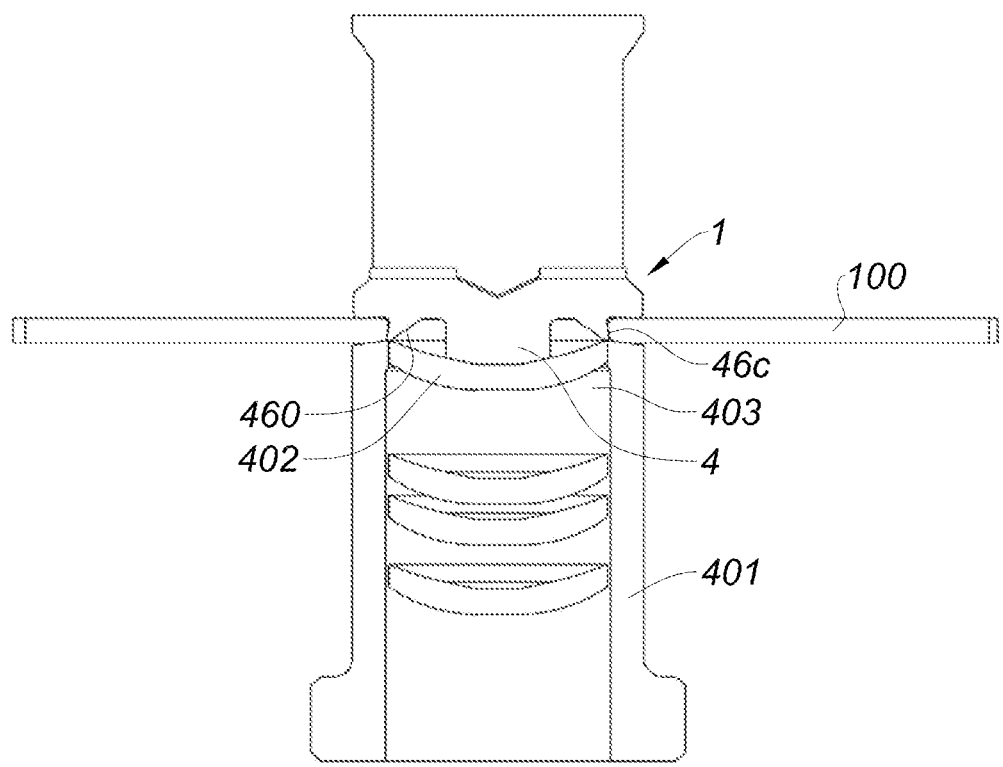
FIG. 14 is a sectional view of an insert according to an embodiment of the invention.

As illustrated in FIG. 14, a tip 46c of the projecting element 46 may have a projecting shape, in particular a cutting edge shape configured to allow cutting a hole in the first part 100 through which the insert 1 is intended to be fitted. The cutting edge may be oriented outwardly, as illustrated in FIG. 14: thus, this edge may be formed at the junction of two inclined planes including that one arranged on the external side which is less inclined with respect to the axis A than the inclined plane 460 arranged on the side of the body portion 4.

Advantageously, the second end 4b of the body portion 4 projects from a plane flush with the tip 46c, so that the material of the first part 100 is pre-tensioned before cutting, which improves the effectiveness of this cut. The tip 46c may be adapted to cut for example aluminum, plastic, composite materials, or steel.

The projecting element 46 may extend around the body portion 4 according to a path which may for example be circular, ovoid, rectangular, square, etc.

The area or the housing 44 may extend at least partially recessed with respect to the underside of the head portion 2, that is to sat have a bottom 45 which extends at a height comprised between the bearing surface 22 and the docking face 20. This limits the transmission of heat radially from the body portion 4.

The thermal decoupling element may comprise a part, possibly attached, made of a heat-insulating material, for example ceramic, which, where appropriate, may be positioned, partially or totally, inside this area or housing 44. This part may correspond to a ring which may be formed for example by the projecting element 46, this projecting element comprising a heat-insulating material.

Alternatively or complementarily, the thermal decoupling element may comprise a coating (not represented) made of a material more heat-insulating than the material of the body portion 4. This coating may be total, that is to say cover the entirety of the insert 1, or partial, for example arranged on the lateral wall 42 of the body portion 4.

Figure 15:
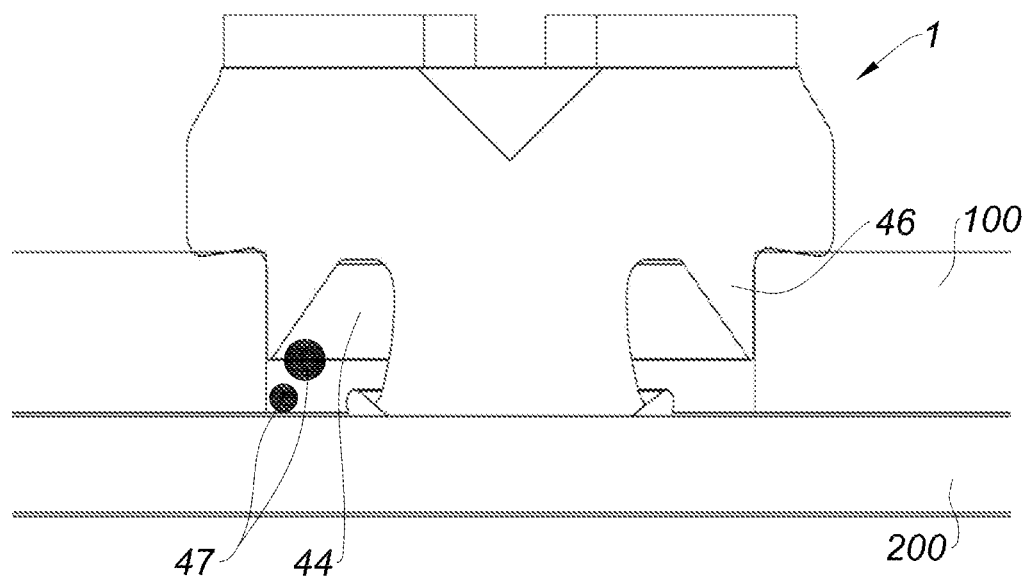
FIG. 15 is a sectional view of an insert according to an embodiment of the invention.

Preferably, as illustrated in FIG. 15, the peripheral area or housing 44 serves as a receiving area for splashes 44 of melting matter during the welding operation, blocked by the projecting element 46. The evacuation of the melting matter towards the free receiving area is also promoted by the decreasing section of the second end 4b, and more specifically of the welding surface 40, in particular because of its conical or trunconical shape.

Figure 16:
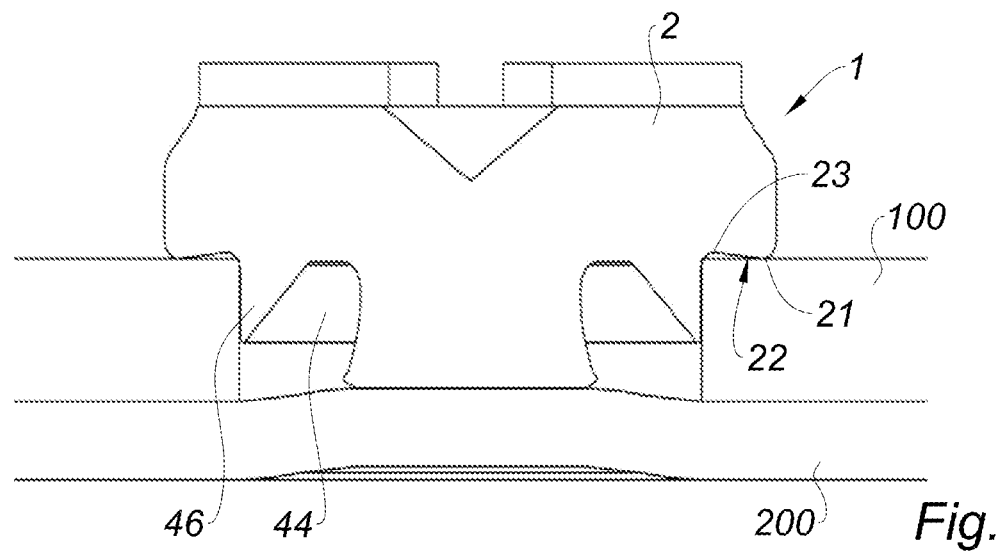
FIG. 16 is a sectional view of an insert according to an embodiment of the invention.

As illustrated in FIG. 16, the free area between the first part 100 and the body portion 4 also enables the second part 200 to buckle in this free space during the welding, which creates a bias effectively keeping tensioned the assembly resulting from the welding operation. Indeed, during the welding operation, the material of the body portion 4 is consumed such that the second part 200 buckles in the free area under the pinching effect exerted by the electrodes and to compensate for the reduction of the length of the body portion 4. Thus, the tension is stored in the assembly once and for all.

Still with reference to FIG. 16, it should be noted that the head portion 2 may have a peripheral flange 21 underneath and intended to bear against the first part 100. This peripheral flange 21 may be formed at the end of the bearing surface 22, which may for example be inclined with respect to a plane orthogonal to the axis A, so as to form a peripheral pocket 23 beneath the head portion 2, thereby conferring to the head portion 2 some elasticity which will contribute to the tensioning of the assembly. This pocket may also allow absorbing a possible difference in the differential expansion between the first part 100 and the insert 1, these being possibly made of different materials.

Figure 19:
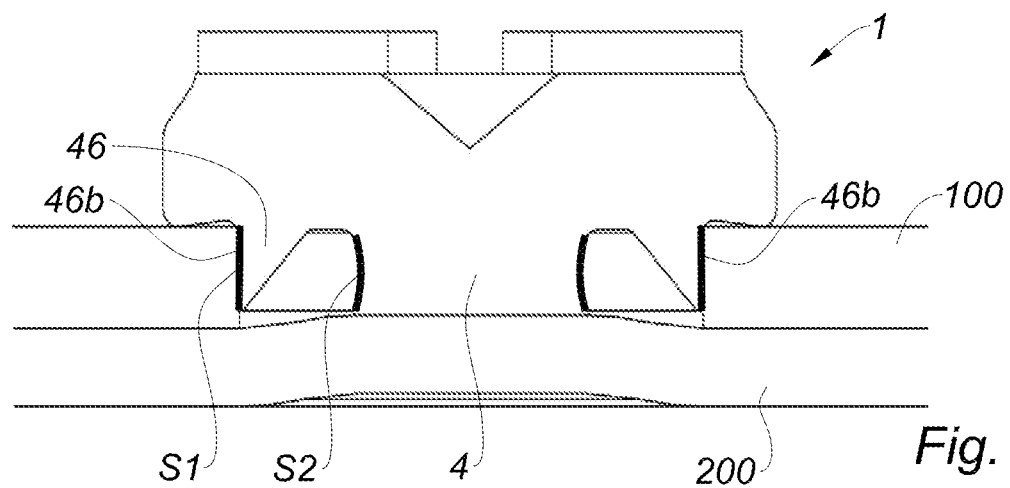
FIG. 19 is a sectional view of an insert according to an embodiment of the invention.

As illustrated in FIG. 19, the external lateral face 46b may be configured to have a larger surface area 51 than the surface area S2 of the residual lateral wall 42 after welding. In particular, the projecting element 46 may extend according to the axis A over a height such that its tip 46c is at the level or below the middle of the body portion 4. This allows avoiding peening or micro-tears problems.

The insert 1 advantageously comprises holding element configured to immobilize the insert 1 in position through the first part 100, and thus avoid a relative displacement of one relative to the other likely to bring the body portion 4 and the first part 100 in contact.

For example, the holding element comprises a blocking surface 6, which may be the external face 46b and/or a tip or axial face 46c of the projecting element 46 and/or the lateral wall 24 of the head portion 2, intended to hold the body portion 4 at a distance from the first part 100 when the insert 1 is fitted into this first part 100.

The holding element may comprise lugs or indentations 47 arranged on the blocking lateral surface 6, in particular on the tip 46c of the projecting element 46, so as to engage the head portion 2 and the first part 100 with one another.

The lateral wall 24 of the head portion 2 may have a portion with a section decreasing in the direction of the docking face 20, such that the holding element may include this portion 24a with a decreasing section of the lateral wall 24.

The holding element may also comprise a portion 24a of the lateral wall 24 of the head portion, the portion 24a adjoining the docking face 20 to the rest of the lateral wall 24. This portion 24 is with a section decreasing in the direction of the docking face. The first part 100 may extend over this portion 24a with a decreasing section, for example by overmolding.

Figure 17:
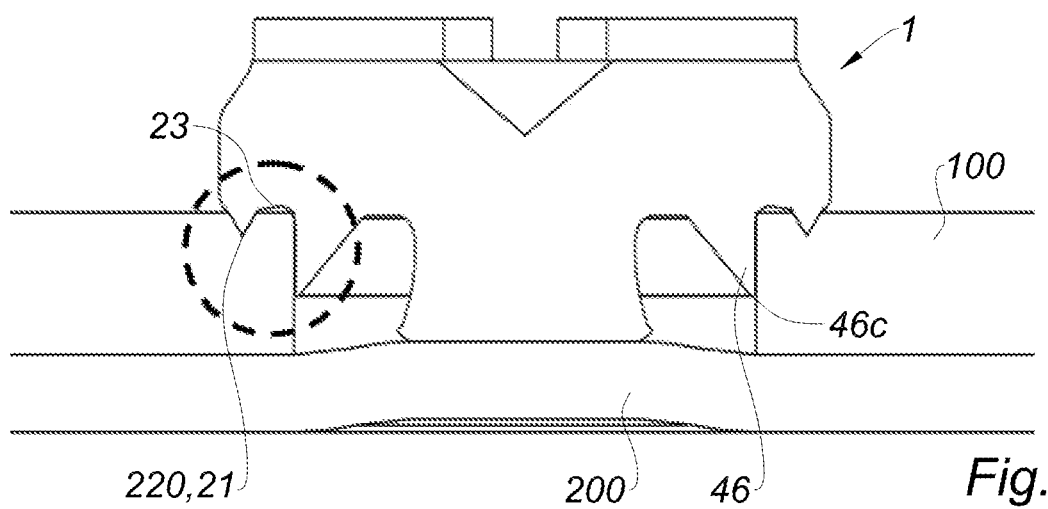
FIG. 17 is a sectional view of an insert according to an embodiment of the invention.

According to the embodiment illustrated in FIG. 17, the holding element may comprise a protrusion 220', for example annular, projecting from the bearing surface 22. Where appropriate, this protrusion 220 may also be the peripheral flange 21, the pocket may be delimited between this protrusion and the projecting element 46.

The holding element is preferably arranged on the head portion 2.

The thermal decoupling element is advantageously interposed between the body portion 4 and the holding means.

Thus, the thermal decoupling element is configured to hold the first part 100 at a distance from the body portion 4 before and during the welding operation.

Figure 9:
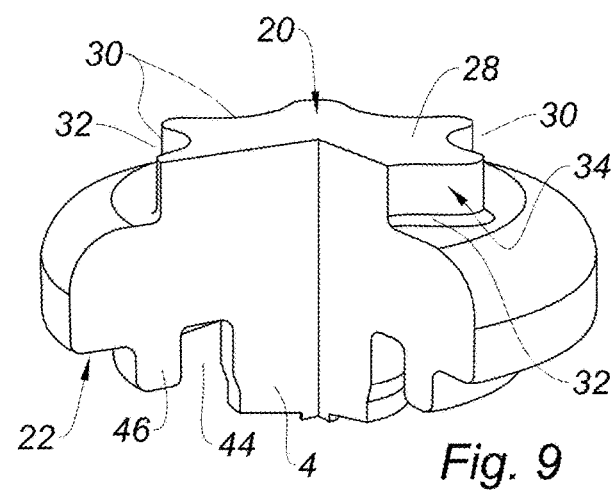
FIG. 9 is a perspective and partial sectional view of an insert according to an embodiment of the invention.
Figure 10A:
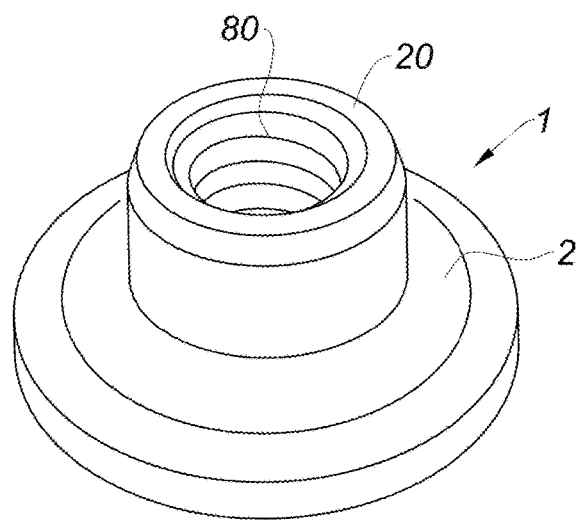
FIGS. 10A and 10B are respectively top and bottom perspective views of an insert according to an embodiment of the invention, integrating means for fastening to a complementary component.
Figure 10B:
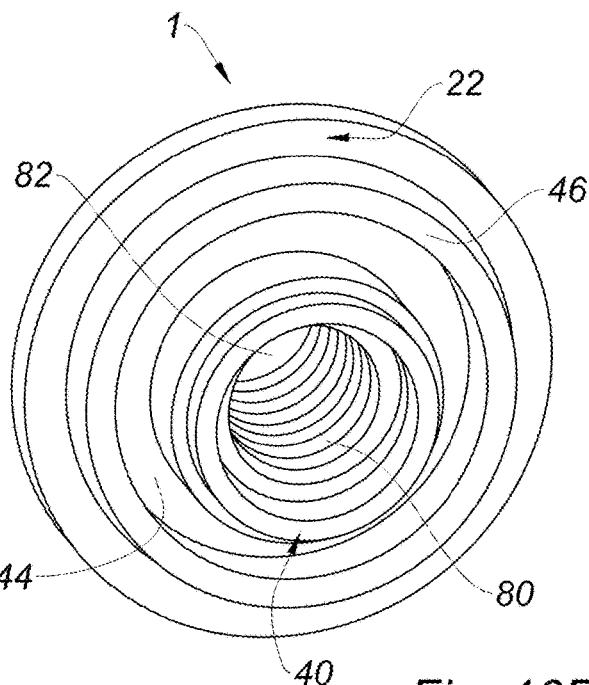
Figure 11A:
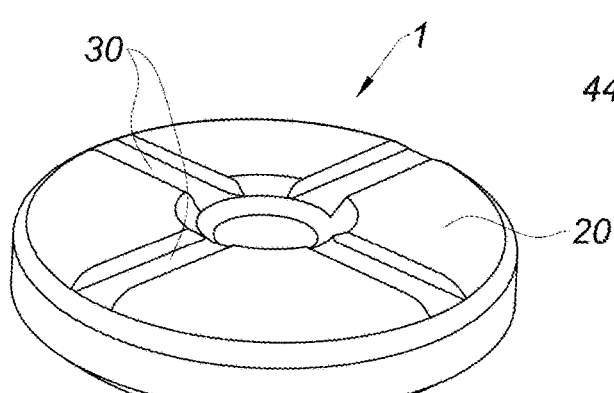
FIGS. 11A and 11B are respectively top and bottom perspective views of an insert according to an embodiment of the invention, integrating means for fastening to a complementary component.
Figure 11B:
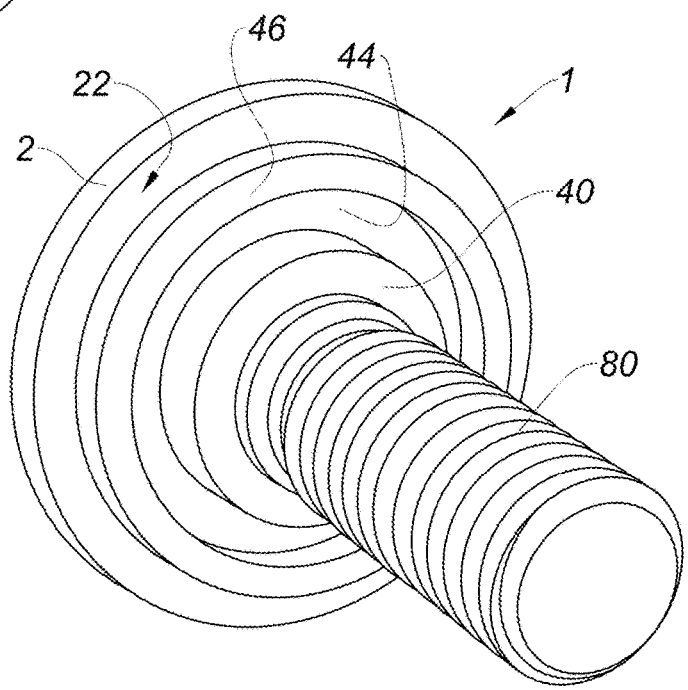

As illustrated for example in FIGS. 2, 9 and 11A, the docking face 20 may have one or several protrusion(s) 28 delimiting one or several venting channel(s) 30 intended for the circulation of a coolant, such as air, during the welding operation. For example, the coolant is expelled via the outside or the inside of the welding electrode 300 in the direction of the docking face 30. The venting channels 30 have a radial opening enabling the evacuation of the coolant out of the venting channels 30. Preferably, the radial openings 32 are arranged above the lateral wall 24 of the head portion 2.

Moreover, it should be noted that the head portion 2, in particular the docking face 20, advantageously comprises an engagement surface 34, for example orthoradial or with an orthoradial component, configured to receive a tool, for example a screwdriver or a key, in order to apply to the head portion 2 a force, in particular a torque, intended to break the weld or the insert 1. This engagement surface 34 may correspond to a lateral wall of a protrusion 28 of the docking face, and may, where appropriate, partially delimit one or more venting channel(s) 30. According to the example of FIG. 9, the engagement surface 34 is formed on the lateral wall of a star-shaped protrusion 28 such as an imprint or a hexalobular internal key. The engagement surface 34 may correspond to a portion of the lateral wall 24.

As illustrated in FIGS. 10A, 10B, 11A and 11B, the insert 1 may comprise a fastening element configured to allow fastening on the insert 1 a component, such as for example a screw or a nut, this component may comprise a complementary fastening element configured to cooperate with the fastening element of the insert 1. The fastening element may include a thread 80 which may be formed in the lateral wall of a hole 82 crossing the insert or in the lateral wall of a rod extending from the second end of the body portion 4. The fastening element may comprise a fastening surface, such as for example a surface intended to a welding or a forced fitting, or else clipping or nesting elements, for example of the bayonet-type.

Another object of the invention is a method for assembling the first part 100 and the second part 200, the assembly method comprising the steps of:

fitting into the first part 100 the insert 1 having all or part of the previously described features, welding the insert 1 on the second part 200.

According to one embodiment, the welding step is a step of electric resistance welding of the insert 1 on the second part 200. The method may comprise beforehand a step of applying a welding electrode 300 on the head portion 2 of the insert 1.

Figure 8:
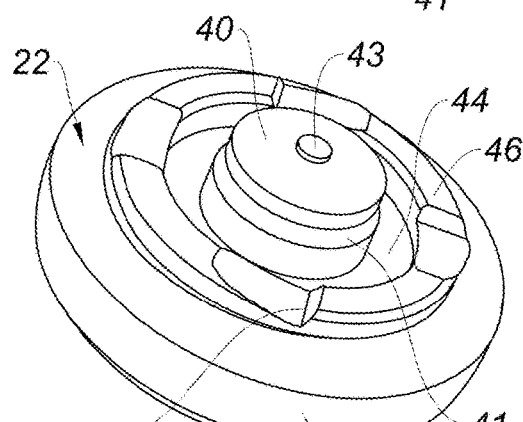
FIG. 8 is a perspective and top view of an insert according to an embodiment of the invention.

The step of fitting the insert 1 into the first part 100 may be performed by rework, in particular by deformation of a portion of the insert 1, such as the lugs forming, where appropriate, the holding element, or of the first part 100, for example similarly to crimping or riveting. The insert 1 may also be screwed, pivotally inserted, into the first part 100, in particular if the insert 1 is provided with lugs or indentations 47 engaging with the first part 100, as illustrated in FIG. 8.

Alternatively, it is possible to directly set the insert 1 in the tooling to the mold of the press intended to form the first part 100. In other words, the step of fitting the insert 1 into the first part 100 may advantageously be performed during the manufacture of the first part 100, in particular during an operation of molding the first part 100. In the case where the first part 100 is made by injection, for example plastic injection, the insert 1 may be overmolded and thus linked to the first part 100. This overmolding may be accompanied with a deformation of the insert to reinforce the mechanical interaction between the insert 1 and the first part 100.

Figure 13:
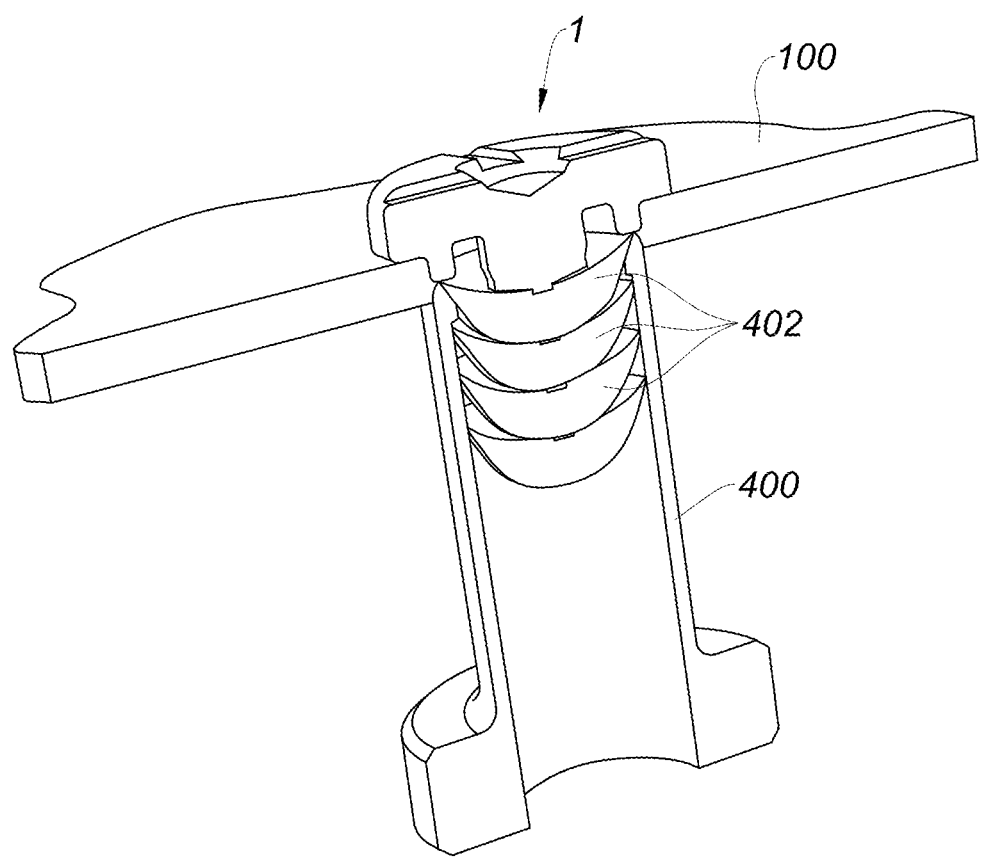
FIG. 13 is a perspective and sectional view illustrating a step of the method for assembly via an insert according to an embodiment of the invention.

Moreover, the fitting step may comprise a cutting of the first part 100 in order to materialize a housing which will enable the set-up of the inert 1, in particular in the case of a first part 100 made of a composite, made on the base of a structure or of a reinforcement based on long fibers whether structured or not. The making of the cut may be performed on closure of the mold, for example by means of a hollow tube 401, represented in FIG. 13. During the closure of the tooling or of the mold, the tube is brought to cut a matter piece or swarf 402 in the first part 100. This matter piece or swarf may be extracted before opening of the mold or of the tooling, via the inside of the tube having generated the cut. The evacuation of the matter piece or swarf may be performed continuously and therefore without disturbing the production, for example by means of the insert 1 which, during its insertion inside the hole generated by the cut, is brought to push this piece or swarf in the tube. The cut of a matter piece or swarf may also concern a first metallic part, for example made of aluminum, which is made by cutting-stamping, in particular in a transfer press. There too, in this cutting step, the step of fitting the insert is performed during the manufacture of the first part 100, and not during the rework.

According to the example of FIG. 14, the cutting is carried out by the insert 1 itself, more specifically by means of the projecting cutting edge 46c. The effectiveness of the cutting may be amplified by the prolongation of the second end 4b which comes into contact with the first part 100 before the cutting edge 46c starting performing its cut. Thus, the first part 100 buckles under the load that is applied on the insert 1; for which load a counter-force may be exerted via a tube or a hollow matrix 401. The recess of the matrix 401 firstly accommodates the buckling of the first part 100. The punch formed by the cutting edge 46c, or the matrix 401, continues its travel in the axis of the inert 1 and cuts a matter swarf 402 whose dimension is close to the dimensions and the geometry of the crown formed by the projecting element 46. Afterwards, this swarf 402 is evacuated via the recess 403 that has been arranged in the matrix 401. The cutting may be operated at cold or hot temperature.

Thus, the insert 1 itself serves as a punch. Hence, there is no pre-hole to provide for in order to ensure the set-up of the insert 1 on the first part 100. In addition, the cutting of the first part being adjusted to the crown formed by the projecting element 46, the insert 1 is thus secured to the first part 100 without any dimensional clearance.

The fitting step may be carried out during a body-in-white assembly operation.

The step of applying the electrode 300 is performed by bringing in contact the welding electrode 300 against the docking face 20. This step advantageously comprises the use of an electrode having a section, in particular a diameter, larger than or equal to the section, respectively the diameter, of the head portion 2 of the insert 1. In practice, the electrode 300 may have a diameter equal to the diameter of the head portion 2 of the insert 1 to which are added the uncertainty on the location of the insert 1 with respect to the first part 100, the uncertainty on the location of the first part 100 with respect to the second part 200, and the uncertainty on the location of the set composed by the first part 100 and the second part 200 with respect to the robot arm and more generally with respect to the welding tip. Thus, it is the dimeter of the electrode 300 which compensates for all location defects.

The method may comprise the application of a second electrode 400 on the second part 200, more particularly opposite the insert 1. However, it is possible to provide for only one single electrode, namely the electrode 300 applied on the insert 1, in order to carry out a single-access welding. Indeed, the second end 4b provides a limited point or surface contact between the insert 1 and the second part 200, such that it is not necessary to pinch the insert 1 and the second part 200 between two electrodes in order to obtain a contact point, as is done for example between two sheet metals to be assembled by electric resistance welding. Thus, the method is advantageously exempt of pinching of the set formed by the insert and the second part 200 between two welding electrodes. In the case where one single electrode 300 is used, the second part 200, or, where appropriate, a part bearing directly or indirectly against the second part 200 like a third sheet metal or fourth sheet metal, is for example connected to the ground or to an opposite polarity. In the case where a second electrode 400 is used, the section or the dimensions, in particular the diameter, of this second electrode 400 may be smaller than the section or the dimensions, in particular the diameter, of the electrode 300 applied to the head portion 2 of the insert 1, for example similar to the section or to the dimensions, such as the diameter, of the body portion 4 of the insert 1.

Figure 12B:
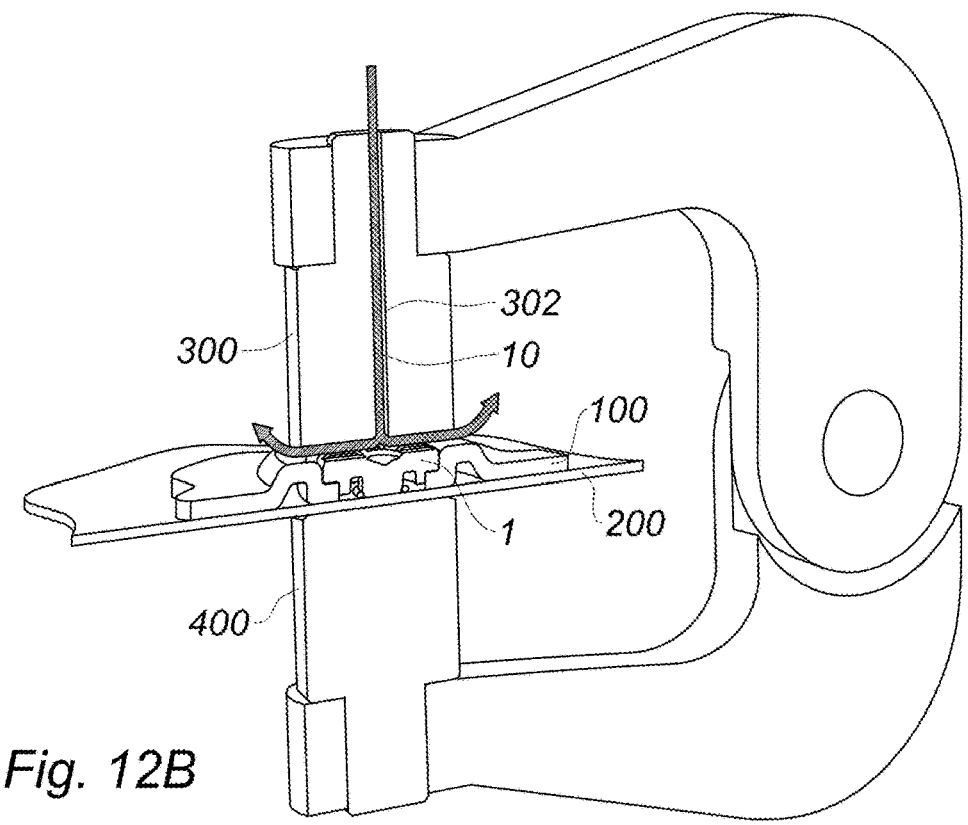

The resistance welding step may include a step of cooling the welding electrode 300 and/or the insert 1. This cooling step comprises the circulation of a coolant 10, such as air, for example compressed air, through a conduit 302 of the electrode 300, and its projection in the direction of the insert 1, in particular towards the head portion 2 or docking face 20 of the insert 1. Afterwards, this coolant may circulate through venting channels 30 made on the docking face 20 or made on the end of the welding electrode 300 to be oriented radially and thus cool down more effectively the head portion 2 of the insert, which is in contact with the first part 100. The cooling may be performed by conveying the coolant, in particular centrally, via the inside of the welding electrode 300, as illustrated in FIG. 12B, via the outside of the welding electrode 300, peripherally, for example by means of nozzles arranged around the welding electrode 300. Preferably, the cooling step takes place during, and/or after, the welding operation, that is to say during and/or after the circulation of an electric current through the insert 1.

The assembly method comprises a step of gluing the first part 100 and the second part 200, in particular before the step of welding the insert 1 on the second part 200, the welding step may intervene before drying and/or cross-linking of the glue and thus ensure the holding of the first and second parts 100, 200 while waiting for the materialization of the glued joint, that is to say after drying or cross-linking. More particularly, the gluing step comprises a deposition of glue over the first and/or the second part 100, 200, then, where appropriate, a localization of the first and second parts 100, 200 relative to one another. Afterwards, the method comprises, at the time of welding the insert 1 on the second part 200, a step consisting in exerting a pressure on the insert 1 in order to materialize a docking, that is to say a contacting, between the first and second parts 100 and 200. This contact is ultimately held via the insert 1 welded to the second part 200, and that without any lag time as is conventionally the case during a method of assembly with glue alone. In other words, there is no need to wait for drying or cross-linking of the glue. The first and second parts 100, 200 are fixed. Thus, the glue can dry or be cross-linked during the following operations in the manufacture, such as for example during a subsequent cataphoresis-type treatment step.

Figure 18:
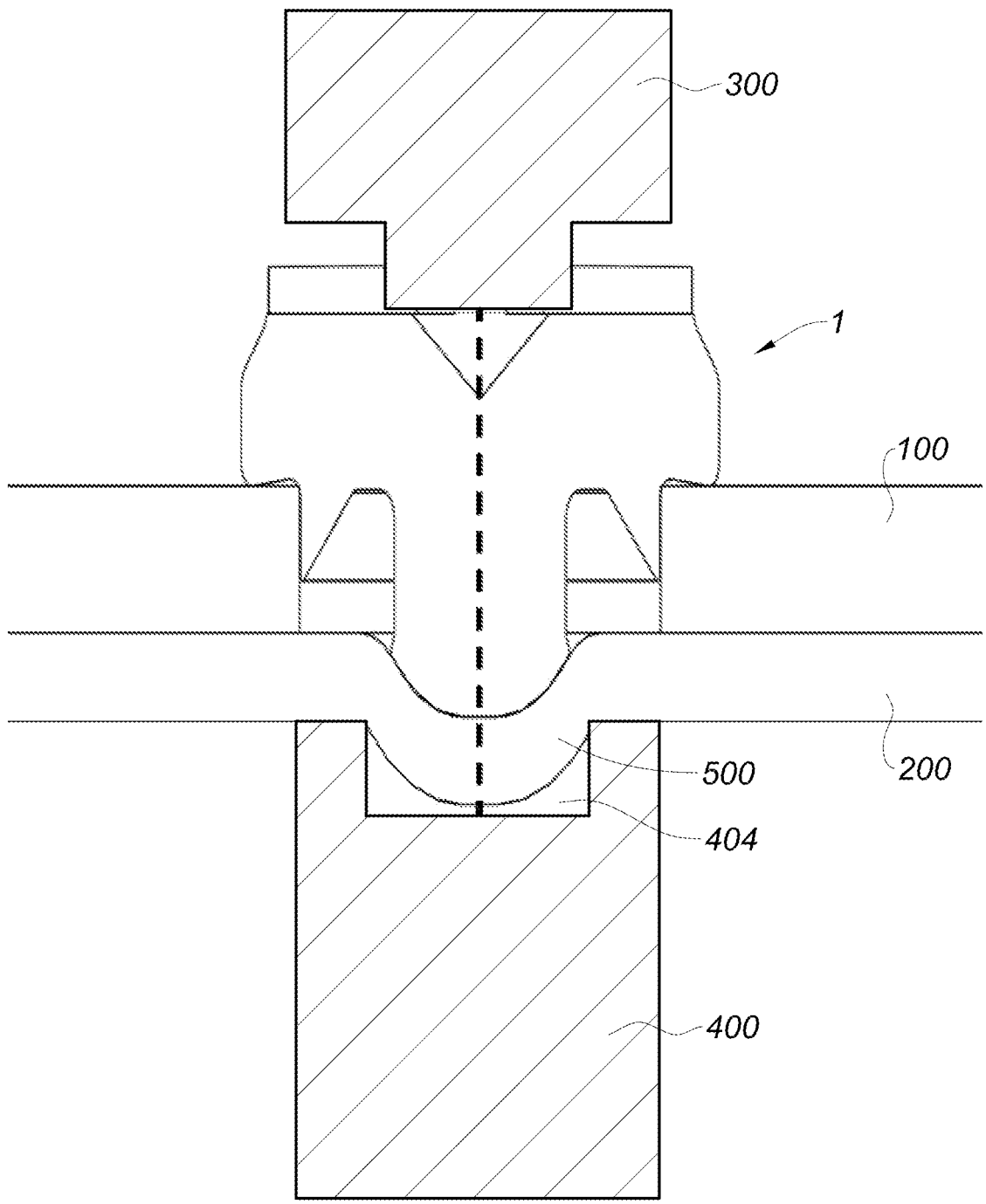
FIG. 18 is a sectional view of an insert according to an embodiment of the invention.

Referring to FIG. 18, the method may comprise the formation of a boss 500 into which the body portion 4 of the insert 1 is inscribed and welded. This reinforces the mechanical strength of the obtained assembly, and also allows using this boss 500 to perform a second assembly, for example during another welding. The boss 500 may be formed by the second electrode 400 provided with a recess 404, on closure of the electrodes, either before or during the transmission of the welding energy.

According to another embodiment, the welding step is a friction welding step. The insert 1 is rotated about the axis A. This rotation, associated with an axial force according to the axis A, generates a localized heat-up between the second end 4b and the second part 200. This temperature rise allows carrying out the welding. The rotation of the insert 1 about the axis A may be ensured by means of a tool applied on the engagement surface 34.

The insert 1 according to the invention allows obtaining a multi-material assembly which is robust and without extra costs. The invention finds application for example in the automotive industry for the assembly of the body-in-white and constitutive elements, the assembly of door leafs such as doors, hoods or trunks, in the aeronautical industry for example for the assembly of fuselage elements or structural elements, and other industries related in particular to the railway, agricultural fields, etc.

Of course, the invention is in no way limited to the above-described embodiment, this embodiment having been provided as example. Modifications are possible, in particular with regards to the constitution of the various devices or by substitution with technical equivalents, yet without departing from the scope of the invention.

The invention claimed is:

1. An insert intended for the assembly of a first part and a second part by electric resistance welding of the insert and of the second part, wherein the insert comprises:

a head portion, the head portion comprising a docking face configured to receive a welding electrode and a bearing surface configured to bear on the first part in order to hold the first part assembled to the second part, a body portion intended to be inserted into the first part, the body portion comprising a welding surface configured to be welded to the second part, the body portion having a section smaller than that of the head portion, and a thermal decoupling element extending around the body portion to prevent a transmission of the heat released by the body portion to the first part during a welding operation, wherein the thermal decoupling element comprises a peripheral groove containing a heat-insulating material, the peripheral groove is delimited by one element or several elements projecting from an underside of the head portion, and wherein the insert comprises a holding element configured to hold the insert in position through the first part, the holding element comprising an outer side face of the one element or the several elements projecting from the underside of the head portion intended to keep the body portion at a distance from the first part when the insert is integrated with this first part, and wherein the peripheral groove is configured to serve as a receiving area for splashes of melting matter during the welding operation, said splashes being blocked by the one element or several elements projecting from an underside of the head portion.

2. The insert according to claim 1, wherein a tip of the one element or the several elements projecting from the underside of the head portion forms a cutting edge intended to cut the first part.

3. The insert according to claim 2, wherein the welding surface is configured to bear against the first part before the cutting edge formed by the tip.

4. The insert according to claim 1, wherein the one element or the several elements projecting from the underside of the head portion extends at least up to a mid-height of the body portion.

5. The insert according to claim 1, wherein the head portion comprises at least one venting conduit.

6. The insert according to claim 1, wherein the head portion comprises an engagement surface configured to receive a tool in order to apply to the head portion a force intended to break a weld or the insert.

7. The insert according to claim 1, wherein the body portion comprises a portion with a reduced section in a direction of the welding surface.

8. The insert according to claim 1, wherein the insert comprises a fastening element configured to allow fastening on the insert a component intended to cooperate with said fastening element.

9. The insert according to claim 1, wherein the head portion comprises a first material and the body portion comprises a second material distinct from the first material.

10. The insert according to claim 1, wherein the bearing surface has a peripheral flange intended to bear against the first part.

11. An assembly method for assembling a first part and a second part, the assembly method comprising the steps of:
fitting an insert according to claim 1 into the first part, and welding the insert to the second part.

12. The assembly method according to claim 11, wherein the step of fitting the insert into the first part is performed during the manufacture of the first part.

13. The assembly method according to claim 11, wherein the step of fitting the insert into the first part comprises a step of cutting the first part by the insert.

14. The assembly method according to claim 11, wherein the method further comprises a step of cooling the insert.

15. The assembly method according to claim 11, wherein the method further comprises: the use of one single electrode applied on the insert; a step of gluing the first part and the second part; and formation of a boss in the second part.

\* \* \* \* \*